United States Patent [19]

Gibes

[11] 3,879,059

[45] Apr. 22, 1975

[54] FENDER CONSTRUCTION FOR WHEEL LOADERS

[75] Inventor: Richard J. Gibes, Plainfield, Ill.

[73] Assignee: Caterpillar Tractor Company, Peoria, Ill.

[22] Filed: Jan. 7, 1974

[21] Appl. No.: 431,100

[52] U.S. Cl. .......................... 280/153 R; 296/28 CV
[51] Int. Cl. ............................................. B62d 25/16
[58] Field of Search ........ 280/153 R, 153 A, 153 B, 280/152, 154.5 R; 296/28 CV

[56] References Cited
UNITED STATES PATENTS

| | | | |
|---|---|---|---|
| 1,303,567 | 5/1919 | Lorimer | 280/153 R |
| 2,679,403 | 5/1954 | Howard et al. | 280/154.5 R |
| 3,497,237 | 2/1970 | Vis | 280/152 R |
| 3,700,259 | 10/1972 | Scheinkoenig | 280/152 R |

Primary Examiner—David Schonberg
Assistant Examiner—Michael J. Forman
Attorney, Agent, or Firm—Phillips, Moore, Weissenberger, Lempio & Strabala

[57] ABSTRACT

A wheel loader comprises a frame having a fender secured thereon to substantially cover each forward pair of ground engaging wheels. The fender comprises a rearward portion covering a rearward side of each wheel and an upper portion covering the top of the wheel. The upper portion comprises a forward section, having an open frame construction, detachably mounted thereon.

14 Claims, 5 Drawing Figures

FENDER CONSTRUCTION FOR WHEEL LOADERS

BACKGROUND OF THE INVENTION

Modern earthworking vehicles, such as wheel loaders, normally comprise fender constructions which provide substantial protection to the operator and vehicle components in the event that the wheel kicks up debris during an earthworking operation. In addition, the advent of track belts and the like on the wheel dictates the need for a heavily constructed fender upon the remote possibility that the track belt would break. Conventional fenders normally do not provide such full protection while yet providing the vehicle's operator with good visibility. In addition, the forward portion of the fender is normally subjected to the greatest potential damage and cannot be replaced unless the entire fender is so replaced.

SUMMARY OF THIS INVENTION

An object of this invention is to overcome the above briefly described problems by providing an economical and compact fender for an earthworking vehicle which exhibits a high degree of structural integrity, does not unduly impair an operator's vision and is adapted to be repaired expeditiously. The fender comprises a rearward portion secured on a side of the vehicle's frame to extend generally downwardly from above one of the wheels to a protective position behind the wheel and an upper portion having a forward section extending forwardly in cantilevered relationship thereon. One novel aspect of this invention comprises the utilization of a reinforced open frame construction for the forward section to permit a substantially unobstructed view from the operator's cab of the vehicle towards the front end of the vehicle. Another novel aspect of this invention is the detachable mounting of such forward section on the upper portion of the fender by releasable fastening means to facilitate replacement thereof.

BRIEF DESCRIPTION OF THE DRAWINGS

Other objects of this invention will become apparent from the following description and accompanying drawings wherein.

DETAILED DESCRIPTION

Figure 1:
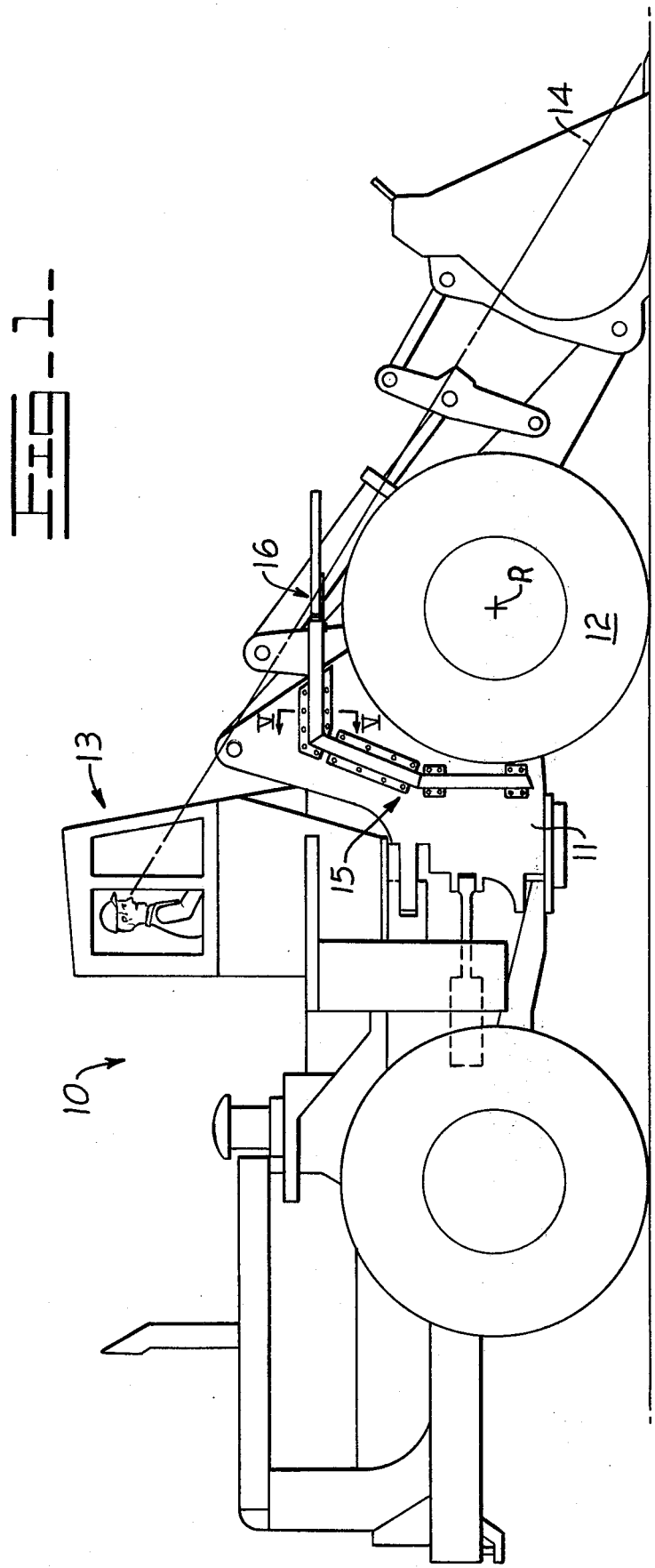
FIG. 1 is a side elevational view of a wheel loader having the fender of this invention mounted thereon.
Figure 2:
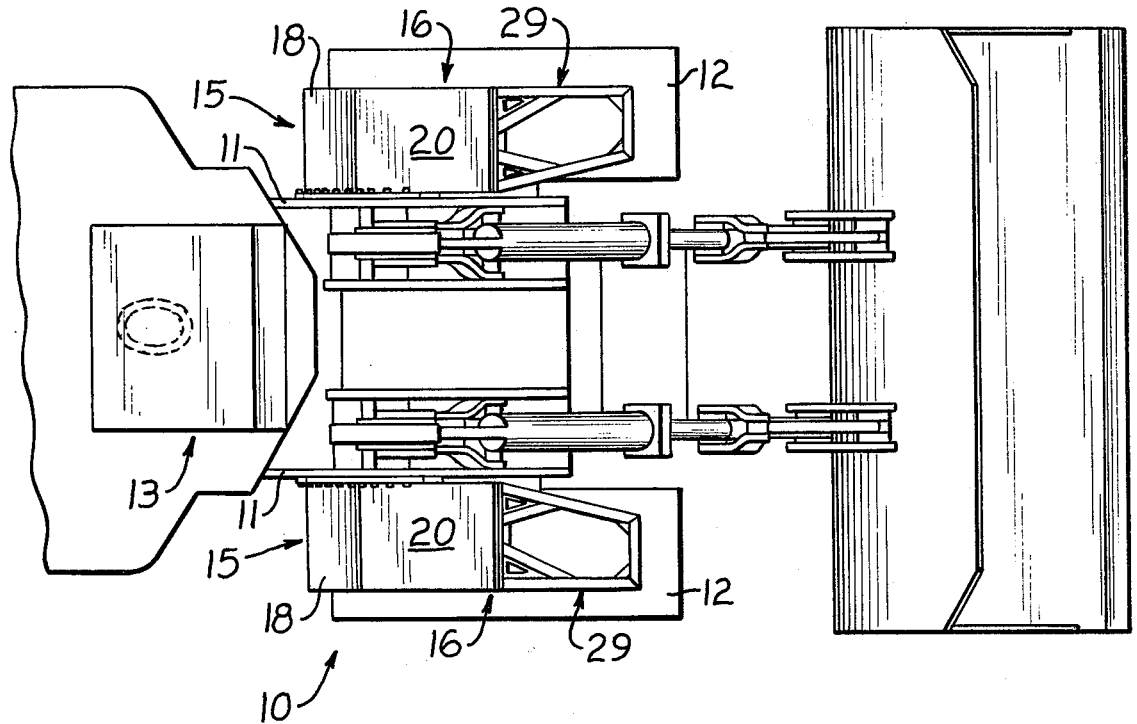
FIG. 2 is a top plan view of a front portion of the wheel loader.

Referring to FIG. 1, an articulated wheel loader 10 comprises a front frame 11 having a pair of laterally spaced ground engaging road wheels 12 rotatably mounted on a front end thereof. An operator's cab 13 is mounted on the vehicle, rearwardly of the wheels, to permit the operator to have a clear line of vision over and alongside the roadwheel, as depicted by imaginary line 14. A fender of this invention comprises a rearward portion 15 secured on a side of frame 11 and an upper portion 16 secured to the side portion and partially attached to the frame.

Figure 3:
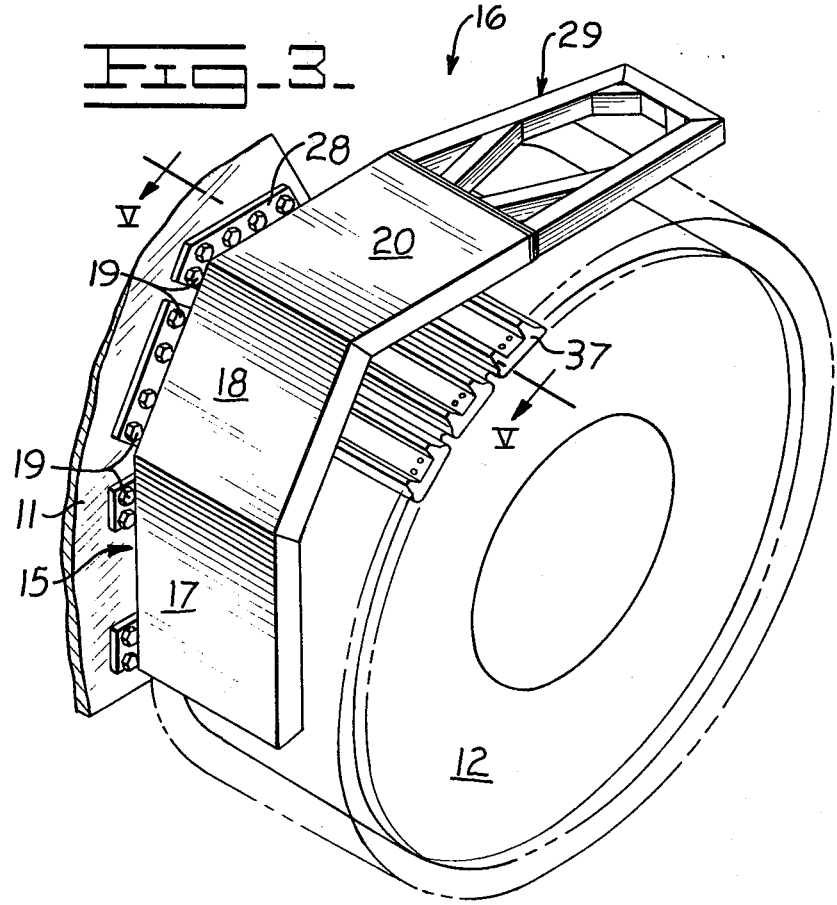
FIG. 3 is an isometric view illustrating the fender in covering relationship relative to a road wheel of the vehicle.

The fender's rearward portion extends at least generally vertically downwardly from above a respective road wheel 12 a substantial distance behind such wheel in covering relationship therewith. The fender's side portion comprises sections 17 and 18 (FIG. 3) welded together and detachably mounted on frame 11 by bolt 19. The fender's upper portion extends at least generally horizontally towards the front of a vehicle to substantially cover the wheel.

Figure 5:
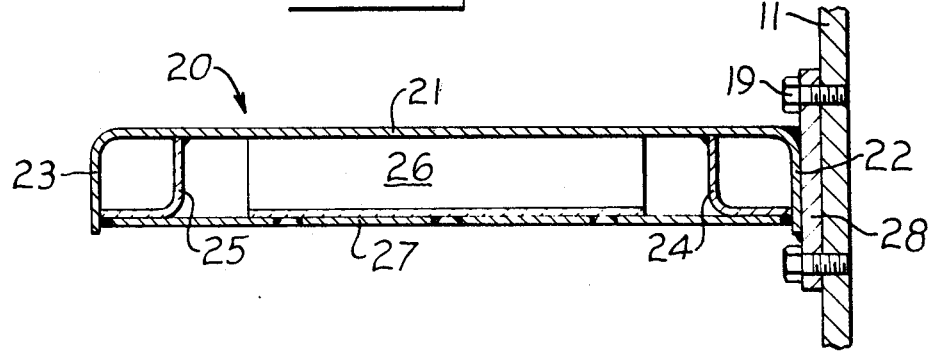
FIG. 5 is a sectional view of the fender, taken in the direction of arrows V—V in FIG. 3.

The fender's upper portion comprises a rearward section 20 welded or otherwise suitably secured to section 18 and also bolted onto the frame by bolts 19. As shown in FIG. 5, section 20, as well as sections 17 and 18, comprises an inverted U-shaped cover plate 21 having downwardly extending inner and outer flanges 22 and 23, respectively. Angle bars 24 and 25 are respectively secured at their edges to the underside of the cover plate and the flanges to form a rigid, reinforced box section at the inner and outer corners of each section 17, 18 and 20.

A plurality of longitudinally spaced and inverted U-shaped reinforcing members 26, disposed between angle bars 24 and 25, are welded to the underside of the cover plate. A bottom plate 27 extends between and is secured to the angle bars. Inner flange 22 of the cover plate is welded to a mounting plate 28, bolted to frame 11 by bolts 19.

Figure 4:
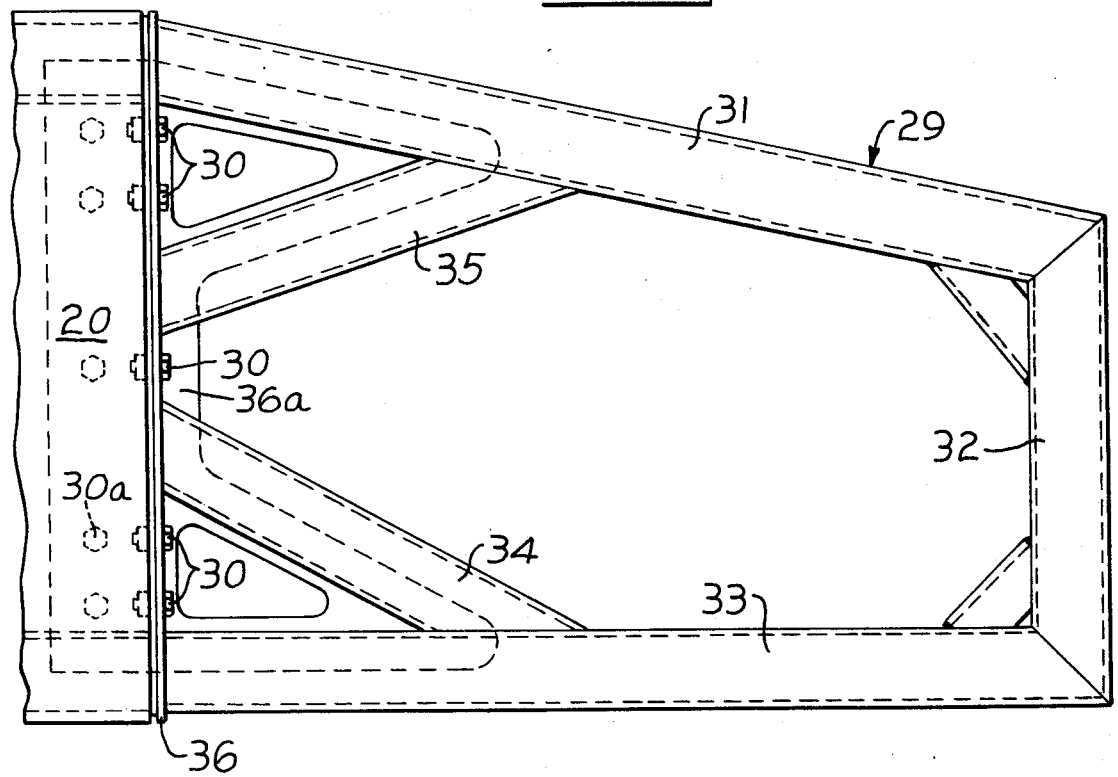
FIG. 4 is a top plan view of a forward section of the fender.

Referring to FIG. 4, upper portion 16 further comprises a forward section 29 extending forwardly in cantilevered relationship thereon. The forward section extends forwardly from approximately a rotational axis R of wheel 12 and terminates at its forward end adjacent to the front of wheel 12. The forward section is detachably mounted on section 20 by releasable fastening means, such as bolts 30.

As further shown in FIGS. 1 and 4, the forward section constitutes a reinforced open frame construction positioned to permit substantially unobstructed view along an imaginary line of vision 14, extending from operator's cab 13 towards a front end of a vehicle in approximate tangential relationship with respect to wheel 12. The forward section comprises a series of integral box sections 31, 32, 33, 34 and 35 suitably welded together. Forwardly disposed box section 32 is secured between the forward ends of laterally spaced box sections 31 and 33.

Intermediate pair of box sections 34 and 35 have their forward ends secured to a respective box section 31 or 33. Box sections 34 and 35 converge rearwardly towards and have their rearward ends secured to a mounting plate 36 as do the rearward ends of box sections 31 and 33. A plate 36a is secured to the bottoms of box sections 31, 33, 34 and 35. The mounting plate 36 and plate 36a are bolted to a forward end of section 20 by bolts 30 and 30a.

As mentioned above, the disposition of the fender's forward section 29 substantially covers the top of wheel 12 and also permits a substantially unobstructed view along line of vision 14 from the operator's cab (FIG. 1). Should such forward section be damaged by impact with a flying object, such as a broken track belt 37 of wheel 12 (FIG. 3), the forward section would tend to bend upwardly to guide the broken track belt forwardly and away from operator's cab 13. Any portion of a broken belt which may be thrown upwardly and rearwardly of forward section 29 would be positively arrested by fender sections 17, 18 and 20. The damaged forward section can be replaced expeditiously by merely releasing bolts 30. Likewise, the entire fender may be replaced, if so desired, by merely removing and replacing bolts 19.

I claim:

1. In an earthworking vehicle comprising a frame having a pair of laterally spaced ground engaging wheels rotatably mounted on a front end thereof and an operator's cab mounted on said vehicle, rearwardly of said wheels, the invention comprising a fender comprising a rearward portion mounted on a side of said frame to extend at least generally vertically downwardly from above one of said wheels a substantial distance behind said wheel in covering relationship therewith and an upper portion secured to said rearward portion to extend at least generally horizontally towards a front of said vehicle to substantially cover the top of said wheel, said upper portion including a forward section extending forwardly in cantilevered relationship on said upper portion, said forward section constituting a reinforced open frame construction, including a plurality of integrally connected reinforcing sections forming the perimeter thereof, positioned to permit a substantially unobstructed view along an imaginary line of sight, extending from said operator's cab towards a front end of said vehicle in approximate tangential relationship with respect to said wheel.

2. The vehicle of claim 1 wherein the rearward portion and a rearward section of the upper portion of said fender are integrally secured together and detachably mounted on said frame by releasable fastening means.

3. The vehicle of claim 2 wherein the rearward portion of said fender comprises a pair of sections integrally secured together, each of said pair of sections and said rearward section detachably mounted on said frame by releasable fastening means.

4. The vehicle of claim 3 wherein each of said pair of sections and said rearward section are integrally secured to a mounting plate detachably mounted on said frame by said releasable fastening means.

5. The vehicle of claim 3 wherein each of said pair of sections and said rearward section comprises an inverted U-shaped cover plate having downwardly extending inner and outer flanges and an angle bar having its edges respectively secured to an underside of said cover plate and to a respective one of said flanges to form a reinforced box section thereat.

6. The vehicle of claim 5 wherein each of said pair of sections and said rearward section further comprises a bottom plate extending between and secured to said flanges and said angle bars.

7. The vehicle of claim 6 wherein each of said pair of sections and said rearward section further comprises a reinforcing member disposed between said angle bars and secured between said cover and bottom plates.

8. The vehicle of claim 1 wherein the forward section of said upper portion extends forwardly from approximately a rotational axis of said wheel and terminates at its forward end adjacent to a front of said wheel.

9. The vehicle of claim 8 wherein said forward section is detachably mounted on a rearward section of said upper portion by releasable fastening means.

10. The vehicle of claim 1 wherein the reinforcing sections comprising the forward section of said upper portion comprise a pair of laterally spaced box sections and a forwardly disposed box section secured between forward ends of said laterally spaced box sections.

11. The vehicle of claim 10 wherein said forward section further comprises a mounting plate secured to rearward ends of said laterally spaced box sections and a pair of intermediate box sections having their forward ends secured to a respective laterally spaced box section and converging rearwardly towards and having their rearward ends secured to said mounting plate.

12. In an earthworking vehicle comprising a frame having at least one pair of laterally spaced ground-engaging wheels rotatably mounted thereon, the invention comprising a fender having a rearward portion secured on a side of said frame to extend at least generally vertically downwardly from above one of said wheels a substantial distance behind said wheel in covering relationship therewith and an upper portion secured to said rearward portion to extend at least generally horizontally towards a front of said vehicle to substantially cover the top of said wheel, said upper portion including a forward section constituting a reinforced frame construction extending forwardly from approximately a rotational axis of said wheel in cantilevered relationship on said upper portion and releasable fastening means detachably mounting said forward section on said upper portion.

13. The vehicle of claim 12 wherein the forward section of said upper portion terminates at its forward end adjacent to a front of said wheel.

14. In an earthworking vehicle comprising a frame having a pair of laterally spaced ground engaging wheels rotatably mounted on a front end thereof and an operator's cab mounted on said vehicle, rearwardly of said wheels, the invention comprising a fender comprising a rearward portion mounted on a side of said frame to extend at least generally vertically downwardly from above one of said wheels a substantial distance behind said wheel in covering relationship therewith and an upper portion secured to said rearward portion to extend at least generally horizontally towards a front of said vehicle to substantially cover the top of said wheel, said upper portion including a forward section extending forwardly in cantilevered relationship on said upper portion, said forward section constituting a reinforced open frame construction, comprising a pair of laterally spaced box sections and a forwardly disposed box section secured between forward ends of said laterally spaced box sections, positioned to permit a substantially unobstructed view along an imaginary line of sight, extending from said operator's cab towards a front end of said vehicle in approximate tangential relationship with respect to said wheel.

* * * * *

UNITED STATES PATENT OFFICE
CERTIFICATE OF CORRECTION

PATENT NO. : 3,879,059
DATED : April 22, 1975
INVENTOR(S) : Richard J. Gibes

It is certified that error appears in the above-identified patent and that said Letters Patent are hereby corrected as shown below:

On the Title Page, Item [73], change the spelling of the assignee's corporate name from "Caterpillar Tractor Company" to --- Caterpillar Tractor Co. ---.

Signed and Sealed this twenty-second Day of July 1975

[SEAL]

Attest:

RUTH C. MASON
Attesting Officer

C. MARSHALL DANN
Commissioner of Patents and Trademarks